United States Patent [19]
Chistov et al.

[11] 3,804,545
[45] Apr. 16, 1974

[54] APPARATUS FOR CUTTING HOLES IN WALLS OF PRESSURE VESSELS

[76] Inventors: Vladimir Semenovich Chistov, Novocheremushkinskaya ulitsa, 41, korpus 1, kv. 39; Samuil Yakovlevich Novak, Mosfilmovskaya ulitsa, 37, korpus 1, kv. 45, both of Moscow, U.S.S.R.

[22] Filed: Sept. 17, 1971

[21] Appl. No.: 181,410

[52] U.S. Cl.................. 408/101, 408/137, 173/145
[51] Int. Cl............................................ B23b 47/20
[58] Field of Search ............ 408/137, 126, 92, 101; 137/318; 173/145

[56] References Cited
UNITED STATES PATENTS 3,512,434   5/1970   Juhasz.............................. 408/137 X
3,335,742   8/1967   Novak............................... 137/318
379,761   3/1888   Burritt.............................. 408/137

*Primary Examiner*—Gil Weidenfeld
*Attorney, Agent, or Firm*—Eric H. Waters

[57] ABSTRACT

Apparatus for cutting holes in walls of pressure vessels, comprising a cutting tool mounted on a shaft, two gears mounted on the same shaft and featuring different numbers of teeth; one of said gears is set on the shaft on a sliding key and serves to transmit the torque, while the other imparts axial displacement to the shaft carrying the cutting tool, by means of a screw pair, both gears meshing with corresponding gears of the drive.

1 Claim, 3 Drawing Figures

APPARATUS FOR CUTTING HOLES IN WALLS OF PRESSURE VESSELS

The present invention relates to apparatus intended for cutting holes in the walls of pressure vessels under pressure of liquid or gas, with a view to connecting branchings to said vessels in the course of their operation.

There are known apparatus used for the purpose, which comprise a housing secured on the pressure vessel and a shaft arranged inside the housing and adapted to carry a cutting tool (cf., U.S. Pat. No. 2,268,089).

Transmitting the torque to the shaft and imparting the axial feed to the shaft carrying the cutting tool is effected with the aid of a screw pair formed by a screw immoveable in the axial direction and a moveable nut connected to the shaft by means of two brackets that are loose-fitted on the shaft and connected to a ratchet wheel.

One of the essential disadvantages of the known apparatus consists in that the value of axial feed per one revolution of the cutting tool depends upon the angle of rotation of the ratchet wheel by means of a lever. Since this is done manually, the angle of rotation cannot be always the same and, consequently, the value of axial feed cannot be constant in the course of cutting holes.

The known apparatus is incapable of providing preset cutting conditions in the course of cutting holes due to the lack of the interrelation between the transmission of torque to the cutting tool and its simultaneous constant axial feed per one revolution of the cutting tool.

Another disadvantage of said known apparatus consists in that such apparatus are only capable of cutting holes whose diameter is limited by the diameter of the drill.

There are also known apparatus for cutting holes in the walls of pressure vessels, which comprise a housing accommodating a valve with a cable, a shaft on which a cutting tool is fitted comprising a cutter and a drill, a chamber with a bleeder mounted on the housing (cf., U.S.S.R. Inventor's Certificate No. 150,447).

In the known apparatus the torque is transmitted manually with the aid of a lever set on the shaft end, while the axial feed is imparted to the cutting tool owing to the provision of a screw pair whose nut is immovable in the axial direction.

The cutting tool in the last-mentioned known apparatus comprises a drill and a cutter owing to which holes of a larger diameter can be cut in the walls of pressure vessels.

This latter known apparatus, however, features a similar lack of the interrelation between the rotation of the cutting tool with its simultaneous axial feed.

As a result, frequent breakages of the cutting tool occur which necessitate the disassembly of the apparatus under complicated conditions of a pressurized system.

It is an object of the present invention to eliminate the afore-listed disadvantages of said known apparatus.

Another object of the invention is to develop an apparatus featuring a design that provides for the rotation of the cutting tool with its simultaneous axial feed under preset conditions of cutting.

In the accomplishment of said and other objects of the present invention, in an apparatus intended for cutting holes in the walls of pressure vessels, wherein the cutting tool is mounted on a shaft, according to the invention, mounted on the same shaft coaxially therewith are two gears having different numbers of teeth and meshing with gears of the drive, one of said former gears being set on the shaft on a sliding key and serving to transmit the torque, while the other one of said former gears serves to impart axial displacement to the shaft carrying the cutting tool and is connected by means of a carrier to an axially immoveable nut of a screw pair whose screw is connected to the shaft by means of splines.

An advantage of the apparatus disclosed herein resides in the fact that it provides for preset conditions of cutting while drilling and milling in the course of cutting holes in the walls of pressure vessels.

The apparatus of the invention makes for a reliable operation owing to the microfeed of the cutting tool, which helps obviate the need for frequently sharpening the tool in view of its low wear and ensure the cutting of holes of an unlimited diameter without breaking the cutting tool.

In the apparatus disclosed herein, owing to the provision of interrelation between the rotation of the cutting tool and its simultaneous axial feed, labour-consuming manual operations are obviated, which brings about a considerable increase in the efficiency.

The present invention will be better understood upon considering the following detailed description of an exemplary embodiment thereof to be taken in conjunction with the accompanying drawing, wherein.

Figure 1:
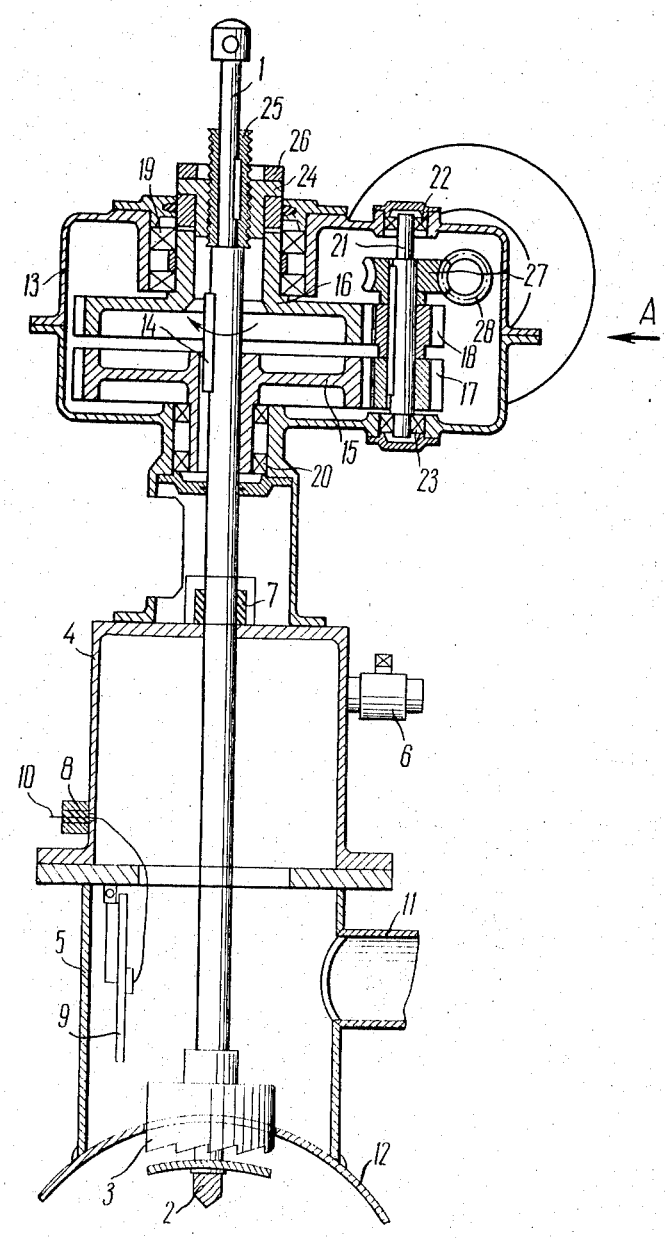
FIG. 1 shows a general view of the apparatus according to the invention, in a longitudinal section.

The apparatus disclosed herein comprises a shaft 1 mounting a cutting tool which is composed of a drill 2 and a cutter 3, and a chamber 4 with a bleeder 6 and stuffing-box seals 7 and 8. The seal 7 can be tightened.

The chamber 4 is mounted on a housing 5 which accomodates thereinside a flap-shaped valve 9, a cable or wire 10 and a branch pipe 11.

The housing 5 is welded to a pressure vessel 12 on which drilling is to be performed with the tool.

Mounted on the chamber 4 is a means providing for the rotation and axial feed of the shaft, which is essentially a cluster gear encased in a housing 13.

Set on a sliding key 14 on the shaft 1 is a gear 15 in mesh with a gear 17 set on a shaft 21 of the drive having a worm pair 27, 28.

Another gear 16 is set on the same shaft 1 by means of a screw pair comprising a screw 25 connected to the shaft 1 with the aid of splines and a nut 24 connected to the gears 16 via a carrier 26. Gears 15, 16 have different numbers of teeth.

The nut 24 is actually immoveable on account of the following features of design: a/ the nut is made in the form of a hollow cylinder having a thread on its inner surface, with diametrally arranged projections on its outer surface; and b/ the carrier 26 is also made in the form of a hollow cylinder having at one end of its body open, diametrally arranged L-shaped grooves, of which one groove is parallel to the longitudinal axis of the cylinder, and forms and angle at which it is entered by the projections of the thread on the nut 24, preventing axial displacement of the latter.

A spline connection is provided between the smooth shaft 1 and the screw 25. Such a connection makes it possible to easily install and remove the screw onto and from the shaft in the process of adjustment of the apparatus. All these details are shown in the drawings.

Appropriate supports or bearings 19, 20; 22, 23 are provided for gears 16, 15 on the one hand as well as for shaft 21 on the other hand.

The gear 16, in its turn, is in mesh with a gear 18 set on the shaft 21 of the drive with the worm pair 27, 28.

The gear 16 is connected to the shaft 1 by means of a rapidly detachable screw pair having a thread running opposite to the direction of rotation of the shaft and consisting of the screw 25 and the nut 24, as aforementioned, brought into rotation by the carrier 26 fastened on a thread on the hub of the gear 16.

Figure 2:
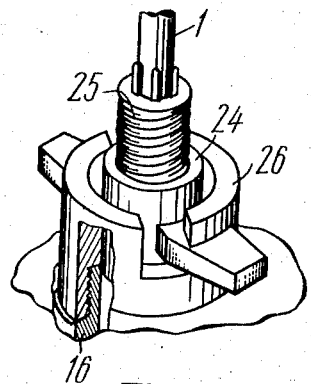
FIG. 2 illustrates the cooperation of certain parts in the drive mechanism, in an enlarged, partial perspective view.

The screw 25 is connected to the shaft 1 with the aid of splines and has an external thread. The nut 24 is made with an internal thread and has two diametrally opposite projections on its outer surface. The carrier 26 has two slots on its cylindrical surface into which the protrusions of the nut 24 fit. Details are shown in the partial perspective view in FIG. 2.

Figure 3:
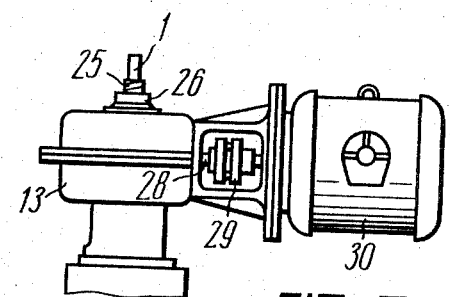
FIG. 3 is a partial view of the structure, encircled in FIG. 1, and taken in the direction of the arrow A.

An electric motor 30 (see FIG. 3) is secured on housing 13 and is connected to the worm shaft 28 of the worm pair 7, 28 via a clutch 29. The worm 28 engages with the worm wheel 27 mounted on the drive shaft 21, as described earlier.

The inventive cutting apparatus includes an operating mechanism, constituted by an actuating mechanism which ensures rotation of both the smooth shaft 1 which carries the cutting tool 2, 3 and the screw 25, and of the axially stationary nut 24. The operating mechanism is constituted by the drive shaft 21 on which are mounted the gears 17, 18, and the worm wheel 27 whose worm 28 is connected to the shaft of the electric motor 30, preferabl by means of the clutch 29.

The screw pair constitutes by the nut 24 and the screw 25 is not installed rigidly but with the possibility of removal since the screw 25 is freely mounted on the shaft 1 with the aid of splines, and the nut 24 is detachably connected to the carrier 26, which makes it possible to rapidly install or remove the screw pair.

The apparatus in accordance with the present invention operates in the following manner.

The apparatus is mounted on the housing 5 welded to the pressure vessel 12.

At the moment of assembly the shaft 1 with the cutter 3 and drill 2 mounted thereon is in an upper position, in the chamber 4. At this moment, the shaft 1 is not yet provided with the screw pair comprising the screw 25 and the axially immoveable nut 24. In order to keep the shaft 1 in its upper position, the stuffing-box seal 7 is tightened.

As soon as the apparatus is secured in position, the stuffing-box seal 7 is tightened.

As soon as the apparatus is secured in position, the shaft 1 with the cutter 3 and drill 2 set thereon is lowered until the drill 2 is thrust against the wall of the pressure vessel 12. Thereupon, required conditions of cutting are preset for the given diameter of a hole to be cut and the screw 25 is set on the splined shank of the shaft 1 together with the nut 24 which is threaded to the gear 16 with the aid of the carrier 26.

The preliminary operations over, the drive 21 is actuated by means of an electric or pneumatic motor (not shown in the drawing) at a worm pair 27, 28.

The drive shaft 21 rotates the gears 18 and 17 in the same direction. The gear 17 sets to rotation the gear 15 which, by means of the sliding key 14, transmits rotation to the shaft 1 and, consequently, to the cutting tool. The gear 18 sets to rotation the gear 16 which, via the carrier 26, rotates the nut 24 immoveable in the axial direction.

While rotating in the same direction, the gears 15 and 16 feature different angular velocities in view of the fact that they have different numbers of teeth. As a result, the gear 16 lags behind the gear 15 in the number of revolutions per unit time. By this lagging, the gear 16 imparts rotation to the nut 24 in a direction opposite to that of the rotation of the gears 17 and 18 and, thereby, moves the screw 25 in an axial direction downwards, providing for the axial feed of the cutting tool.

The shaft 1, on being imparted rotation from the gear 15 and axial feed — via the screw pair from the gear 16 — performs a rotary motion accompanied by a simultaneous movement in the axial direction.

After the hole-cutting operation has been completed, the drive is disconnected.

By a slight impact the nut 24 is brought out of the groove of the carrier 26 and, by gradually loosening the stuffing-box seal 7, the shaft 1 is raised by force of pressure up to the wall of the chamber 4.

By pulling at the cable 10, the bottom hole in the housing 5 is closed by the flap valve 9.

By rapidly releasing the bleeder 6, pressure in the chamber 4 is dropped.

Thereupon, the apparatus is disassembled.

What is claimed is :

1. An apparatus for cutting holes in the walls of pressure vessels, comprising: a housing; a smooth shaft supported in said housing; a tool for cutting holes in the walls of the vessel mounted on one end of said smooth shaft; a chamber being defined by portions of said housing, for relieving the pressure of a medium after cutting a hole and serving to accommodate said tool in its inoperative position; drive means including an electric motor with a shaft and an operating mechanism including a drive shaft, a worm pair whose worm wheel is mounted on said drive shaft and whose worm is connected to said motor shaft, and driving gears mounted on said drive shaft; a first mechanism for rotating said smooth shaft including a first gear driven by said drive means, a key secured to said smooth shaft and slidably installed in a keyway of said first driven gear, and a second mechanism for axial feed of said smooth shaft, a screw secured to said smooth shaft by means of splines, a nut in threaded engagement with said screw, a second gear driven by said drive means, a carrier fixedly secured to said second driven gear and supporting said nut for rotation therewith and against axial movement thereof, and a carrier connecting said nut to said second driven gear; said screw and said nut being made with their threads running in a direction opposite to the rotation of said smooth shaft; and said driven gears being made with different numbers of teeth to allow said driven gears to rotate at different speeds.

* * * * *